Patented Sept. 3, 1929.

1,727,251

UNITED STATES PATENT OFFICE.

OTTO REIMANN, OF BERLIN-CHARLOTTENBURG, GERMANY, ASSIGNOR TO SEMER & CO., G. M. B. H., OF BERLIN, GERMANY.

METHOD FOR REMOVING THE SAP FROM FELLED TRUNKS AND FOR IMPREGNATING, COLORING, OR DRYING THE SAME.

No Drawing. Application filed November 17, 1927, Serial No. 234,051, and in Germany November 20, 1926.

It is generally known to color or impregnate wood in this manner that the coloring or impregnating liquid is introduced into the wood through incisions or the like provided in the living tree just over the root-stock, the incisions etc. being then covered with a cap, this latter being tightened at the bark, and the coloring or impregnating liquid being then introduced into said cap. The respective liquid contacts, thus, directly with the wood faces at the incisions, etc., and is conveyed from these faces up into the tree by the rising sap with which the liquid gets mixed. In this way the living tree is gradually colored or impregnated, the natural sap being used, as said, as conveying agent for the respective liquid.

Modifications and improvements of the before-mentioned method are described in my U. S. A. Patents 1,500,469 and 1,538,745. In these methods the tree is not provided with incisions or the like, but bores or holes are made in it in several planes which cross one another, these planes lying closely at the root stock and the bores or holes having such a length that the entire sectional area of the tree when viewed from above looks somewhat like a grid of crossed bars. The outer ends of the holes or bores, except one hole or bore or, at the highest, a few holes or bores, are closed by plugs or the like, and the coloring or impregnating liquid is then introduced into the wood through that open bore or hole, or those open bores or holes, by means of a hose or tube.

The methods described in said U. S. A. patents present many advantages over that described in the first paragraph, but suffer in common with them from the drawback that the sap remains in the wood, and must remain in it, in that it is used as the conveying means for the coloring or impregnating liquid, as already stated, the vessels, tubes and ducts, etc. in the wood being, thus, filled not with solely the respective liquid, but with a mixture of it and the sap.

Now, the present still further improved method aims at doing away also with the just mentioned drawback, and for this purpose the sap is removed from the wood either already prior to the introduction of the coloring or impregnating liquid or by means of this liquid, in that this latter is used as driving means for expelling the sap from the wood. In order to attain the effect intended, the method described in my above-mentioned U. S. A. patents is carried out in another way than that described therein, viz, it is carried out not at the living tree, but after the tree has been felled, and the coloring or impregnating or, may be, chemically acting liquid is introduced into the wood not at the root stock, but remote therefrom, at a place located between the two ends or frontal cutting faces, preferably just in the middle therebetween. The holes or bores can be made practically in the same way as in the said U. S. A. patents, but they are arranged, as just stated, practically in the middle of the felled tree so that the sap can be driven out at the two frontal faces of the same. The outer ends of the bores, etc., are again closed, except one or a few, a bandage is laid around the tree at the place where there are the bores, etc., and now either steam under pressure or a compressed gas is introduced through the bandage and the one or several open bores, etc., into the interior of the wood, that is to say, into the sets of the bores, etc., in order to expel the sap, or this is effected directly by means of the coloring or impregnating or, may be, chemically acting liquid, the sap being driven in either case in opposite directions to the frontal ends of the felled tree. The pressure required to expel the sap and drive the other liquid into the vessels, etc., formerly filled with the sap need be only about one half of the pressure formerly required (as in my former U. S. A. patents mentioned), in that the resistance to be overcome is only about one half of the former resistance owing to the length of the way being reduced to about one half, as the liquid need not pass through the entire length of the tree, but only from the middle of the same to the two ends or frontal faces, as described. From the same reasons only about one half of the time formerly required is now necessary, or will do, and besides, no hydraulic pressure, as that of the sap in the upright living tree need be overcome, as the tree is felled and, therefore, in a horizontal position. There escape at the frontal ends, or cutting faces, first the sap and then the steam or gas used for expelling the sap, except that at once the impregnating, etc., liquid is made use of, when this will appear instantly after the last trace of the sap has left the wood.

According to this method vapours, gases, heated or cold air can be forced through the wood in the simplest and most effective manner, quite novel actions upon the wood having thus become possible.

The method according to this invention differs from all the methods for coloring or impregnating felled trunks, which have become known up to the present, in that the action upon the sap contained in the vessels of the wood is not effected from the outer side, i. e. from the end face or from the outer disbarked surface of the wood, but, in the contrary, from the inner side in outward direction.

At the coloring and impregnating of trunks on the living tree the impregnating or coloring is always effected by the ascension of the living sap. While according to the commonly used methods the living sap had to be utilized as carrier of the impregnating or coloring substance just the opposite is aimed at according to the new method.

According to this invention the sap is removed and forced towards the end faces of the trunk, and replaced by the liquid for coloring or impregnating.

The method according to the invention is, therefore, substantially different from the commonly used methods for treating felled trunks in that the sap is removed from the inner portions of the trunk towards the ends of the same, and it differs from the treatment in the living tree in that the ascending sap is not utilized but, on the contrary, removed.

I claim:—

1. The method of removing the sap from felled trunks by introducing a sap-expelling fluid into them, said method consisting in introducing the sap-expelling fluid into the trunk at a place located between its frontal end faces through a plurality of sets of parallel bores overlapping each other over the entire sectional area of the trunk, substantially as set forth.

2. The method of removing the sap from tree trunks and substituting for it a coloring or impregnating liquid, consisting in providing the felled trunk with bores located between the two frontal faces of the trunk, and being so arranged as to cover practically the entire sectional area of the trunk, and forcing the coloring liquid through said bores in opposite directions to the two frontal ends so as to drive the sap forward to said faces until it has completely left the trunk and the coloring liquid has assumed its places, substantially as set forth.

3. The method of removing the sap from tree trunks and replacing it by a coloring or impregnating or chemically acting liquid, consisting in producing in the felled trunks holes in several neighboring planes in which said holes cross one another so as to cover practically the entire sectional area of the trunk; introducing steam or a gas under pressure into said holes and causing the steam or gas to expel the sap through the two frontal ends of the trunk and then introducing an impregnating liquid through the said holes so as to cause it to fill up the empty spaces where the sap has been, substantially as set forth.

4. The method of coloring or impregnating wood, consisting in felling the tree and removing the root stock so as to obtain a trunk having two cut frontal faces; providing the trunk about in its middle with bores or holes arranged in a plurality of parallel planes and being so arranged in the same as to cover practically the entire sectional area of the trunk; closing most of said bores at the outer end, and introducing a fluid under pressure through the remaining bores and causing it to flow within the wood in opposite directions to said two frontal ends, driving thereby the sap out of the wood and remaining finally within as a substitute for the sap, this substitute fluid being adapted to color or impregnate the wood, substantially as set forth.

In testimony whereof I affix my signature.

OTTO REIMANN.